United States Patent
Le et al.

(10) Patent No.: US 7,349,377 B2
(45) Date of Patent: Mar. 25, 2008

(54) METHOD, SYSTEM AND SYSTEM ENTITIES FOR PROVIDING LOCATION PRIVACY IN COMMUNICATION NETWORKS

(75) Inventors: Franck Le, Irving, TX (US); Stefano M. Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 917 days.

(21) Appl. No.: 09/986,602

(22) Filed: Nov. 9, 2001

(65) Prior Publication Data

US 2003/0093553 A1 May 15, 2003

(51) Int. Cl.
*H04Q 7/24* (2006.01)
(52) U.S. Cl. .................... 370/338; 455/432.1
(58) Field of Classification Search ............ None
See application file for complete search history.

(56) References Cited

U.S. PATENT DOCUMENTS

| | | | | |
|---|---|---|---|---|
| 5,572,528 | A * | 11/1996 | Shuen ............... | 370/402 |
| 6,256,300 | B1 | 7/2001 | Ahmed et al. | |
| 6,535,493 | B1 * | 3/2003 | Lee et al. ........... | 370/329 |
| 6,804,720 | B1 * | 10/2004 | Vilander et al. ..... | 709/229 |
| 6,891,820 | B1 * | 5/2005 | Pham et al. ........ | 370/338 |
| 6,982,967 | B1 * | 1/2006 | Leung .............. | 370/328 |

(Continued)

FOREIGN PATENT DOCUMENTS

| | | |
|---|---|---|
| WO | 9916266 | 4/1999 |
| WO | 9937103 | 7/1999 |
| WO | 0076249 | 12/2000 |

OTHER PUBLICATIONS

Bunte, Claudia Martina, "Mobile IP," 1998, Technical University of Darmstadt, Germany, pp. 1-11 (German) and pp. 1-17 (English translation).

(Continued)

*Primary Examiner*—Chi Pham
*Assistant Examiner*—Thai Hoang
(74) *Attorney, Agent, or Firm*—Squire, Sanders & Dempsey, LLP

(57) ABSTRACT

The present invention concerns a method for providing location privacy for a terminal node (MN) in communication with a communication partner node (CN) in a communication network system comprising at least a first communication network (HN, VN), wherein a respective node (MN) communicating via said communication network system is identified by its permanent network address (MN_PA) and addressable by a temporary network address (MN_CoA), at least one server entity (LPS), a plurality of agent entities (LPA1, . . . , LPAn), wherein each of said at least one server entities (LPS) maintains a record of said plurality of agent entities (LPA1, . . . , LPAn) and their respective location within the network system, said method comprising the steps of: requesting (S41), by said terminal node (MN), said at least one server entity (LPS) for location privacy, selecting (S42), at said at least one server entity (LPS), a specific one of said plurality of agent entities (LPA1, . . . , LPAn), based on data maintained in said record of said server entity and said temporary network address of said requesting terminal node, and communicating (S46) messages between said terminal node (MN) and said communication partner node (CN) via said selected one (LPA) of said agent entities. The present invention also, concerns corresponding network systems, server entities, agent entities and terminal nodes.

23 Claims, 12 Drawing Sheets

U.S. PATENT DOCUMENTS

2002/0080752 A1* 6/2002 Johansson et al. .......... 370/338
2002/0085719 A1* 7/2002 Crosbie ...................... 380/248
2002/0114323 A1 8/2002 Chowdhury et al.

OTHER PUBLICATIONS

Johnson, David B., et al., "Mobility Support in IPV6," Jul. 2, 2000, IETF Mobile Working Group, Internet Draft, pp. 1-122.

* cited by examiner

Record of Database means

| FROM<br>MN CoA in domain | TO<br>CN Addr in domain | LPA<br>to be selected = |
|---|---|---|
| domain#1 | domain#1 | LPA#1 |
| | domain#2 | LPA#2 |
| | domain#3 | LPA#3 |
| | domain#n | LPA#n |
| domain#2 | domain#1 | LPA#2 |
| | domain#2 | LPA#n |
| | domain#3 | LPA#1 |
| | domain#n | LPA#3 |
| ... | ... | ... |

FIG.5A

Location Privacy Request Message

IP fields:
- Source Address: MN's current CoA.
- Destination Address:
  - pre-defined well-know anycast address
  - unicast address of the pre-configured LPS
- Home address Destination Option: MN's home address UDP fields:
- Source Port    variable
- Destination Port    TBD

FIG.7A

Location Privacy Request Message (3)

Type    1 (Location Privacy Request)

Identifier    An identifier to aid in matching Location Privacy Response messages to this Location Privacy Request message.

CN Address    Address of the CN with which the MN asks for Location privacy

FIG.7C

Location Privacy Response Message

IP fields:

Source Address: LPS unicast address.

Destination Address: MN's CoA

Routing header Destination Option: MN's home address

UDP fields:

Source Port    <variable>

Destination Port    Copied from the source port of the corresponding Location Privacy Request

FIG.8A

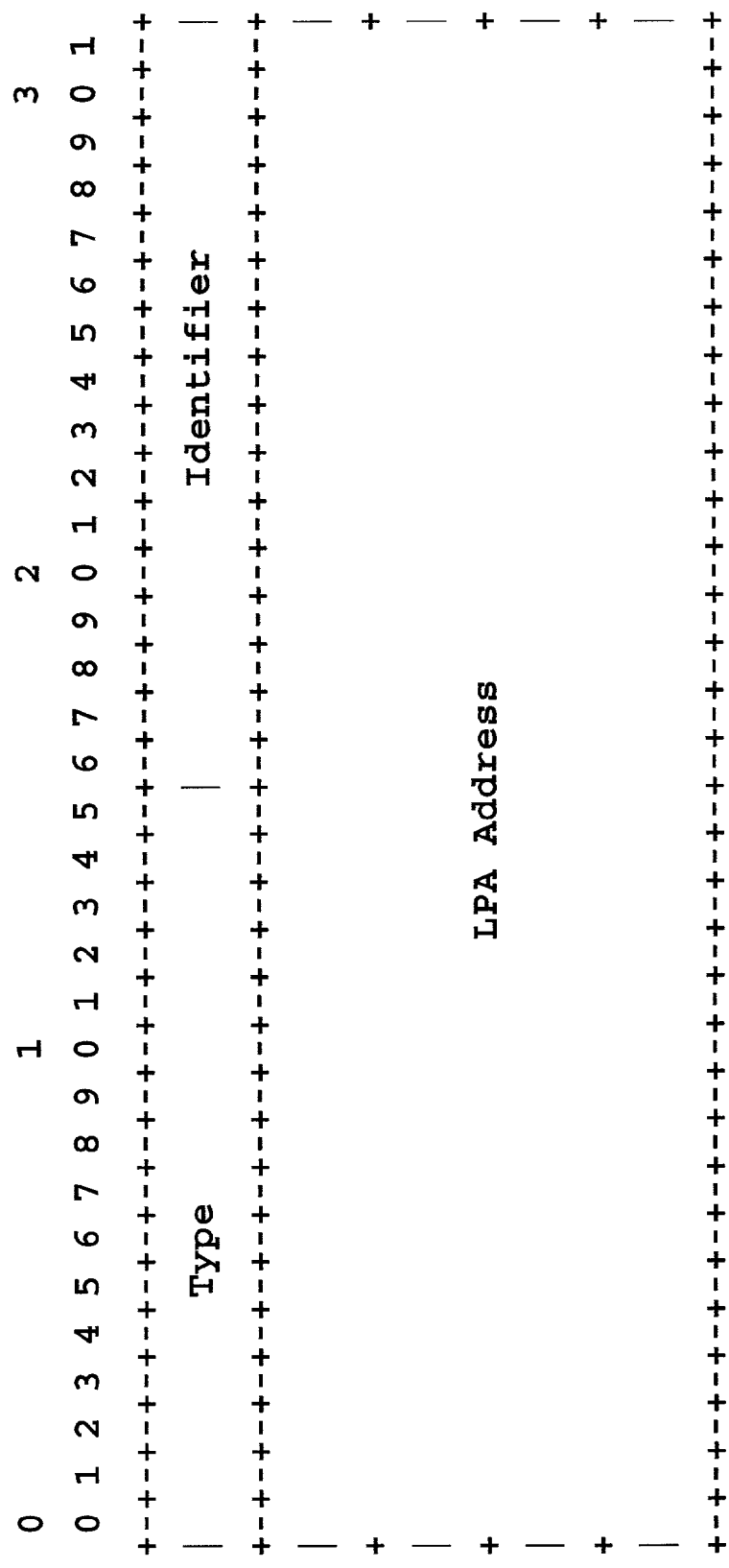

METHOD, SYSTEM AND SYSTEM ENTITIES FOR PROVIDING LOCATION PRIVACY IN COMMUNICATION NETWORKS

FIELD OF THE INVENTION

The present invention relates to a method, system and system entities for providing location privacy in communication networks.

BACKGROUND OF THE INVENTION

Recently, development of communication networks has made considerable progress. Among such communication networks, there are an increasing number of communication networks supporting mobility of the users having subscribed to the networks. A user is represented by a terminal node he uses for communication with a communication partner node. Note that in general a communication partner node is of the same or a similar type than a terminal node, while "partner node" has only been chosen to illustrate that this is the destination or called node in communication. A terminal node/communication partner node may for example be a mobile phone, mobile laptop computer or the like. Nevertheless, a called communication partner node may also be a fixed terminal such as e.g. a personal computer PC.

With the increasing spreading and acceptance of the Internet, a harmonization of communication networks arises in that communication networks tend to be compatible with the Internet. Thus there is a tendency to adopt the Internet Protocol IP also in communication networks other than the Internet. In particular in mobility supporting communication networks, IP is adopted in a mobility supporting version still compatible with IP "as such". For example, Mobile IPv4, Mobile IPv6 or Cellular IP protocol version exists. For the purpose of the present invention it is not crucial which protocol is used as long as the protocol supports mobility of terminals within the communication network (or network system) and as long as the used protocol is a packet-based protocol. A packet-based protocol is a protocol according to which data are transmitted in units of packets (also known as cells) consisting of a payload section and a header section. The payload section carries the data to be communicated while the header section contains management data required e.g. for routing of the packet and indicative of e.g. quality of service QoS provided for the packet. Also, the network itself is not limited for the present invention to be described later as long as the network is a packet-switched network supporting mobility of the users such as for example GPRS, UMTS, the Internet or the like.

A brief general introduction to Mobile IP and definitions of common terms in this technical field can be found under http://www.darmstadt.gmd.de/mobile/mobileip/mobileIP.html, retrieved from the Internet on Oct. 10, 2001.

In communication networks, terminal and/or communication partner nodes are identified by a permanent address PA. If the terminal is immobile, an access point address of the terminal to the network and the terminal's permanent address may coincide with each other. However, if the terminal is mobile, this addressing scheme will not work any longer.

FIG. 1 shows in rough outline a mobile terminal MN identified in the communication network NW by its permanent address MN_PA. On the left hand side, the terminal MN is in a first position pos1 and has access to the network NW via an access point AP1. Assigned to the access point AP1 is an access point address denoted by CoA_1. For example, in a UMTS network, an access point could be represented by a Node_B, while in a GPRS network, an access point could be represented by a SGSN. Assuming that the terminal is mobile, it may reach a position pos2 different from position pos1. In position pos2, however, the access point for accessing the network has changed to access point AP2 (having as its address CoA_2). In such cases, addressing of the terminal MN by its permanent address MN_PA will not be possible any longer.

Therefore, in mobile networks the terminal is addressed by its temporary address CoA (known as care-of-address) which is mapped to its permanent address.

For example, Mobile IPv6 defines a mechanism known as Route Optimization. This mechanism enables Correspondent Nodes CN (communication partner nodes) to directly send packets to the Mobile Node MN (terminal node). Namely, when using Route Optimization, the mobile node MN sends a message (known as Binding Update message) indicating its Care-of-Address CoA to the correspondent code CN. The correspondent node CN caches (buffers) the binding of a mobile node MN (i.e. it maps the MN_PA address to the MN_CoA address), and then sends its datagrams (packets) destined for the mobile node MN directly to the care-of address, bypassing a mobile node's home agent. Mobile IPv6 Binding Update messages carry the CoA of the mobile node MN thus revealing information about its geographic location, but operators want to support Location Privacy. That is, by having knowledge of the Mobile Node's Care of Address, the Correspondent Node can deduce the geographic location of the Mobile Node. That is, a communication partner being aware of the (calling) terminal's care-of-address, may deduce the location (e.g. pos1 or pos2) of the terminal from this temporary address as explained before. (Note that the MN is associated with an MN_CoA for addressing while away from "home", whereas when at home, the MN can be both addressed and identified by the MN_PA.)

One possibility to avoid this is to use a mechanism known as triangular routing using a mobile node's home agent HA in the network. In this case, route optimization will not apply but on the contrary, the correspondent node CN sends the packets to the permanent address PA of the mobile node MN. (Without receiving Binding Update, the mobile node's permanent address MN_PA is the only address the correspondent node CN knows about the mobile node MN). Then the Home agent HA intercepts these packets. And thanks to a Binding cache mapping the MN_PA to the MN_CoA maintained at the HA by having the MN updating it via Binding Update messages; the Home Agent knows where to send the packets and can thus tunnel them to the MN. In the other direction, the MN will use the MN_PA as the source of its packets sent to the CN; and in order to bypass ingress filtering, the mobile node MN first tunnels its packets to the Home Agent which will decapsulate them and send forward them to the correspondent node CN.

Using these mechanisms, triangular routing and reverse-tunneling, MN and CN can still exchange packets and the MN_CoA is not revealed to the CN. Although this approach does not reveal location information by means of the mobile node's care-of-address MN_CoA to the correspondent node CN, this mechanism is not optimized in terms of the routing for the communicated packets as they inevitably have to pass through the mobile node's MN home agent. Thus, triangular routing and reverse tunneling requires going back through the mobile node's MN home network for uplink (from MN to CN) and downlink (from CN to MN) communications and thus implies long routing legs. This may imply a delay of packet delivery. Also, since all packets are routed via the home agent in the home network of the mobile terminal node MN, dependent on the number of other nodes of the same home network communicating via the same home agent of the network or at least via a proper home agent in the same home network, there is a risk that the home network or parts of the network get overloaded by traffic being routed in such a way.

In current cellular networks, location privacy must be supported: The receiving node should not know where the initiating node is geographically located. Mobile IP based networks should at least support the current existing services for a commercial deployment and thus Location privacy should be supported in Mobile IP based networks.

Thus, as basically stated above, Mobile IPv6 has been developed in order to allow an IPv6 Mobile node to seamlessly roam among different subnetworks. When moving to a new point of attachment, the mobile node gets a Care of address and uses it to send and receive packets. This care of address contains information about the mobile node's current location: the network prefix of the care of address may e.g. reveal some information about the current mobile node's location such as the domain and/or any other geographic information.

A mobile node may, however, not want its correspondent nodes to learn such kind of information but may prefer to hide its location. Such property, called Location privacy, is a requirement in some current cellular networks and may be a very desirable if not mandatory feature in IP mobile networks. The goal would be for the corresponding node not to be able to know where the mobile node is located. It is desirable for Mobile IP based networks to at least support the current existing services for a commercial deployment, thus location privacy should be supported in Mobile IP based networks.

Mobile IPv6 allows location privacy to be supported using both triangular routing and reverse tunneling. However, neither of these two solutions is efficient since they require all packets, both destined to and generated by the mobile node, to pass through the home agent. The routing of these packets is therefore not optimal. In addition, these mechanisms rely on tunneling, thus resulting in large overheads (two IP headers) for all the packets originated and sent to the MN. This may not be acceptable over access links where bandwidth is limited and expensive.

In Mobile IPv6, each mobile node is always identified by its home address, regardless of its current point of attachment to the Internet. While situated away from its home, a mobile node is also associated with a care-of address, which may provide to correspondent nodes information about the mobile node's current location.

IPv6 packets addressed to a mobile node's home address are transparently routed to its care-of address: the packets are actually intercepted by a home agent which then encapsulates them to the mobile node's care of address.

A MN may decide not to send any Binding update to the CN but every packets from the CN destined to the MN will then need to go through the HA. This is called triangular routing. The MN can also send a Binding Update to the correspondent node to inform it of its care of address. The correspondent node can thus directly send the packets to the mobile node without going through the Home Agent.

Mobile IPv6 also allows MN to send packets directly to the CN: the source IP address of the packets has to be set to the MN's CoA to bypass ingress filtering and the packets will also carry the Home Address option.

In both cases, the use of Binding Updates and care-of address sourced packets allows the CN to learn the CoA corresponding to the MN and subsequently to learn information about the MN's location.

In order to hide its location, the MN needs to use its home address as the source IP address of the packets, and tunnel packets to the HA to bypass ingress filtering. This is called reverse tunneling.

To support Location privacy with existing mechanisms, both triangular routing and reverse tunneling must be used. However, neither of these two solutions is efficient since they require all the packets, both from the MN to the CN and from the CN to the MN, to go through the Home agent. This may result in very inefficient routing of the packets: e.g. the MN may be from Australia (Home agent therefore in Australia) and roaming to France. Its CN may be in Germany. All the packets exchanged between the MN and CN must go through Australia (France<->Australia<->Germany). The routing of packets between MN and CN is therefore not optimized and this may also induce more delay.

In addition to these drawbacks, since both triangular routing and reverse tunneling rely on tunneling, an extra outer IP header is required. Additional 40 bytes are required for every packets exchanged between the mobile node and the corespondent node.

SUMMARY OF THE INVENTION

Hence, it is an object of the present invention to provide method for providing location privacy for a terminal node in communication with a communication partner node in a communication network system, a corresponding communication network system and corresponding network entities, by means of which the above drawbacks can be eliminated.

According to the present invention, this object is for example achieved by a method for providing location privacy for a terminal node in communication with a communication partner node in a communication network system comprising at least a first communication network, wherein a respective node communicating via said communication network system is identified by its permanent network address and addressable by a temporary network address, at least one server entity, a plurality of agent entities, wherein each of said at least one server entities maintains a record of said plurality of agent entities and their respective location within the network system, said method comprising the steps of: requesting, by said terminal node, said at least one server entity for location privacy, selecting, at said at least one server entity, a specific one of said plurality of agent entities, based on data maintained in said record of said server entity and said temporary network address of said requesting terminal node, and communicating messages between said terminal node and said communication partner node via said selected one of said agent entities.

According to further refinements of the method,
  said request includes the network address of said communication partner node with which a communication is desired to be performed, the permanent network address of said requesting terminal node, and said temporary network address of said requesting terminal node by which it is addressable within said communication network system;
  said respective location of said agent entities is derivable based on a network domain to which the agent entity is assigned, the domain being represented by a network address range in the network;

said selecting is based on said known network address of said communication partner node with which a communication is desired to be performed, which is included in said request;

said selecting comprises the steps of first retrieving a first network domain represented by a network address range to which address range the temporary address of the requesting terminal node belongs, second retrieving a second network domain represented by a network address range to which address range the address of the communication partner node belongs, and determining the agent entity to be selected, based on said retrieved information;

the method further comprises a step of informing said requesting terminal node about the selected agent entity before communicating messages, the method further comprises the steps of creating, by said terminal node at said selected agent entity, a mapping between the terminal node's permanent network address and its temporary network address, and creating, by said terminal node at said communication partner node, a mapping between the terminal node's permanent network address and the selected agent entity's address.

According to the present invention, this object is for example achieved by a communication network system, comprising at least a first communication network, wherein a respective node communicating via said communication network system is identified by its permanent network address and addressable by a temporary network address, at least one server entity, a plurality of agent entities, wherein each of said at least one server entity maintains a record of said plurality of agent entities and their location within the network system.

According to favorable refinements of the system, said respective location of said agent entities is derivable based on a network domain to which the agent entity is assigned, the domain being represented by a network address range in the network;

to each of said communication networks there is associated one of said server entities;

to each of said communication networks there is associated a plurality of said agent entities.

According to the present invention, this object is for example achieved by a server entity comprising a database means adapted to maintain a record of a plurality of agent entities and their respective location within a communication network system, and a processing means adapted to select a specific one of said plurality of agent entities, based on data maintained in said record and a temporary network address of a requesting terminal node.

According to favorable refinements of the server entity, said respective location of said agent entities is derivable based on a network domain to which the agent entity is assigned, the domain being represented by a network address range in the network;

said processing means comprises selection means which comprises first retrieving means adapted to retrieve a first network domain represented by a network address range to which address range the temporary address of the requesting terminal node belongs, second retrieving means adapted to retrieve a second network domain represented by a network address range to which address range the address of the communication partner node belongs, and determination means adapted to determine the agent entity to be selected, based on said retrieved information;

said record is configured by a network operator dependent on a topology of a communication network forming a communication network system;

said record is configured by a network operator dependent on a topology of a communication network forming a communication network system, and said server entity is adapted to extend said record by adding record information from other server entities within said communication network system;

said server entity comprises transmission means adapted to receive and send information used for forming and maintaining said record, receive requests from terminal nodes, and to send processing results to a requesting terminal;

said transmission means is adapted to send processing results to a selected agent entity.

According to the present invention, this object is for example achieved by an agent entity comprising a memory means adapted to cache a mapping of a permanent address identifying a terminal node to a temporary address of said terminal node indicative of a location of said terminal node, and routing means adapted to forward data packets received from said terminal node to an addressed communication partner node, and to forward data packets received from said communication partner to said terminal node, wherein said forwarding is based on the cached mapping information in said memory means.

According to the present invention, this object is for example achieved by a terminal node for use with a communication network system as specified above and adapted to carry out the method as specified above.

By virtue of the present invention, the following advantages can be achieved:

a) location privacy for a terminal node in communication with a communication partner node in a communication network system can be provided; namely, the correspondent node CN does not have any information regarding the geographic location/position of the mobile node terminal, b) packet routing between the mobile terminal node MN and the corespondent node CN is almost as optimized in terms of performance as if Route Optimization was applied, since the location privacy agent is located between the MN and the CN; neither triangular routing nor reverse-tunneling via a home agent is required and long routing legs can be prevented;

c) due to different location privacy agents being used for different correspondent nodes, depending on the correspondent nodes position, traffic within the network system is further distributed and a risk of congestion in some part of the network is further reduced.

The present invention thus describes a solution providing location privacy for a mobile node with optimized routing between the mobile node and the correspondent node. The mechanism described in this document also solves the previous overhead issue.

BRIEF DESCRIPTION OF THE DRAWINGS

The above and still further objects, features and advantages of the present invention will become more fully apparent upon referring to the accompanying drawings, in which

FIG. 5A shows an example of entries to a record maintained at the server entity's side;

FIGS. 7A, 7B, and 7C show details of a location privacy request message format; and FIGS. 8A and 8B show details of a location privacy response message format

DETAILED DESCRIPTION OF THE EMBODIMENTS

Figure 1:
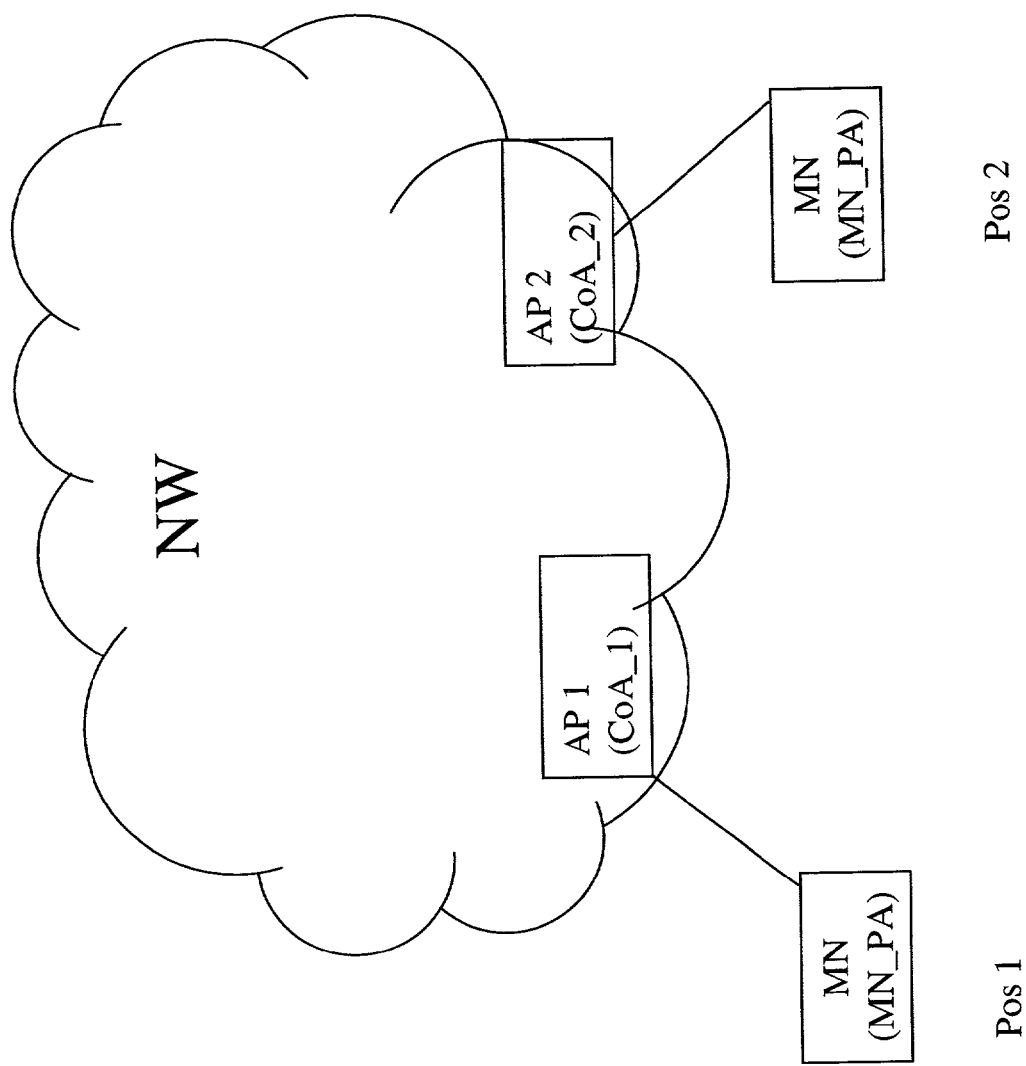
FIG. 1 illustrates in rough outline a mobile terminal MN identified in the communication network NW by its permanent address MN_PA and addressed by its temporary care-of-address MN_CoA.

According to the present invention, triangular routing and reverse-tunneling via a home agent is avoided. Briefly stated, a selected one of a plurality of location privacy agents LPA is used instead, and routing is achieved via the selected location privacy agent (agent entity). The selection of a proper agent entity is achieved by the interoperation with a location privacy server LPS (server entity).

This present invention offers an alternative for Location Privacy allowing optimized routing at the same time. The solution relies on Location Privacy Servers (LPS) in the mobile node's home domain and Location Privacy Agents (LPA) distributed in different locations. The solution does not require any modification neither to the Home Agents nor the CNs.

Upon receiving packets from a CN, or upon initiating a session with a CN, if the mobile node also wants Location privacy, the mobile node sends a Location privacy request to a Location Privacy server. The mobile node may be preconfigured with an address of a Location Privacy Server or can send the request to a well-known anycast address. (Note: A packet sent to an anycast address is delivered to any one of several possible nodes that are identified by that address, typically a node that is closest to the sender of the packet.) A Location Privacy Server will intercept the request and process it. The Location Privacy Request should be secured. A security association can e.g. be pre-established between the MN and its home network and used to protect this message. The Location Privacy Request should (at least) contain the MN's Home Address, the MN's CoA and the CN address.

Based on the MN's CoA and the CN's address, the LPS will assign the appropriate LPA: The LPA should be as close as the CN as possible for location privacy to be efficient; and the LPA should be assigned such that the routing between the MN'CoA and the CN's address, be as optimized as possible.

The LPS sends a Location Privacy Response to the mobile node: such message will include the address of the assigned LPA. The Location Privacy Reponse should be secured. Formats of the Location Privacy Request and Location Privacy Response are subsequently further detailed.

The mobile then sends a Binding Update to the LPA. This will create a binding cache between the MN's CoA and the MN's home address at the LPA, which will then be able to forward the packets sent from the CN.

The mobile node also sends a Binding update to the CN to create a Binding Cache between the MN's home address and the LPA address. The source of such IP packet is set to the MN's home address, and an alternate care of address option will carry the LPA address; or the source of the packet may be simply set to the LPA address. This binding update will be encapsulated and first tunneled to the LPA, which will forward it to the CN. This allows bypassing ingress filtering.

After such procedures, the CN will send packets to the LPA, which will forward them to the MN's CoA; and the MN will send the packets to the CN via the LPA. Routing of these packets is discussed further below.

When moving to different locations and changing CoA, the MN only needs to update the binding cache in the LPA via Binding Update messages.

After changing locations many times, the LPA may not be the most optimized and the mobile node can therefore perform these same procedures: it sends a Location Privacy request to the LPS providing its home address, its new Care of Address but also the CN's address. Then if a new LPA is assigned, as previously, the mobile node sends a Binding Update to the new LPA and a Binding Update to the CN to update its binding cache with the new LPA address.

Security considerations of such mechanism will also be discussed further below.

Subsequently, the present invention will be described in detail with reference to the drawings.

Figure 2:
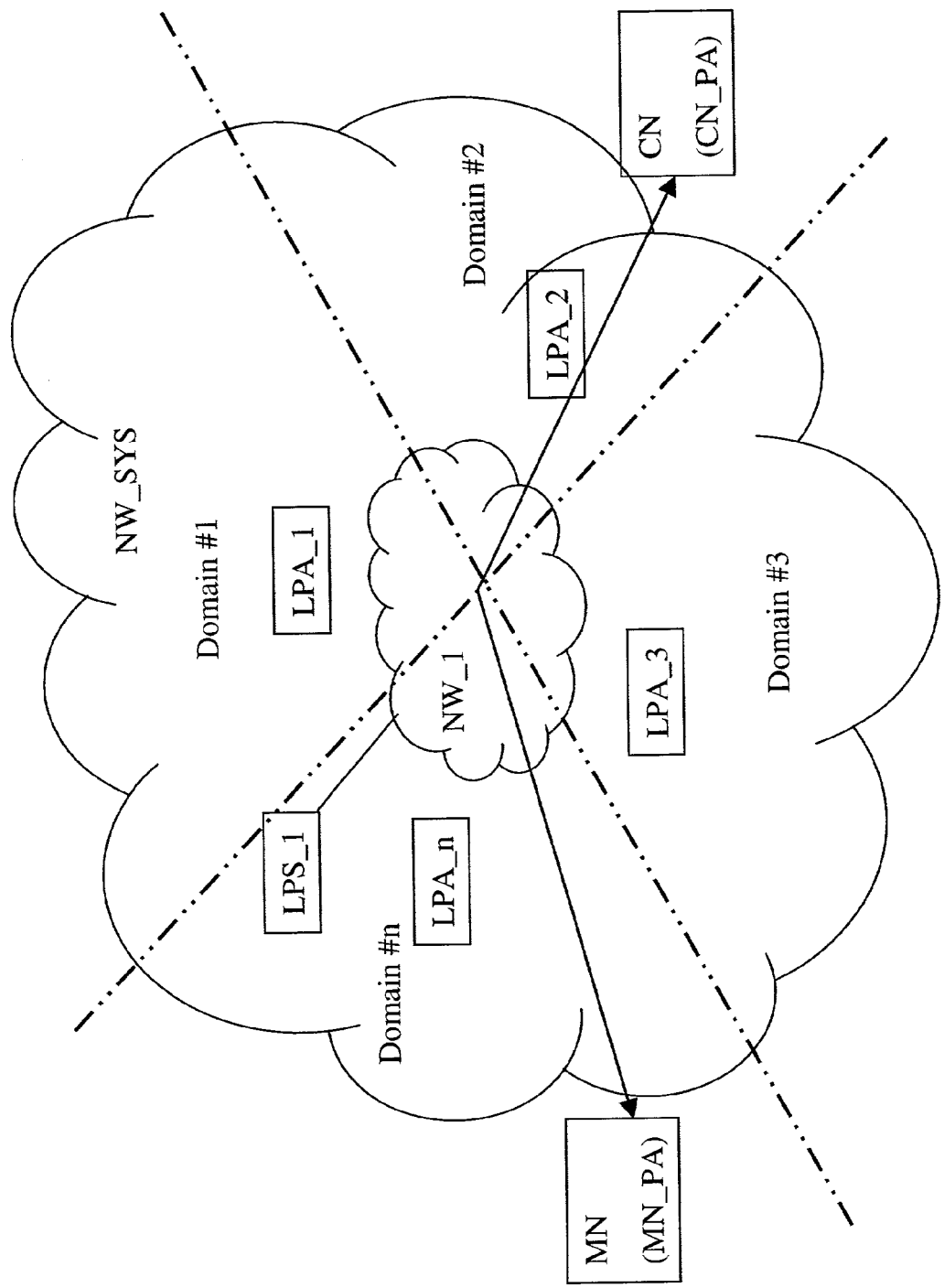
FIG. 2 shows schematically a first example of a communication network system NW_SYS according to the present invention, the system comprising a single communication network NW_1.

FIG. 2 shows schematically a first example of a communication network system NW_SYS according to the present invention. The system NW_SYS comprises a single communication network NW_1. Associated to the network NW_1 is a location privacy server LPS_1 acting as a server entity according to the present invention. Also, associated to the network NW_1 there are a plurality of agent entities also referred to as location privacy agents LPA_1, . . . , LPA_n. (Note that it is not excluded that a server entity LPS and an agent entity could have the same physical location or be housed together.) A mobile terminal node MN identified by its permanent address MN_PA communicates via the communication network system NW_SYS, or via the communication network NW_1, respectively, with a communication partner node CN (also referred to as correspondent node) identified by its permanent address CN_PA. The communication is indicated by a solid line double arrow between MN and CN. (Thus, LPA_2 has been selected according to the present invention in the example illustrated in FIG. 2). In the example of FIG. 2, it may be assumed that NW_1 is the home network for the terminal node MN, while for the correspondent node CN, the network NW_1 could either be the home network or a visited network. Nevertheless, NW_1 could also be a visited network for the terminal node MN.

Note that although not shown, of course the LPA's are also connected to the network NW_1. Furthermore, as is illustrated by the dashed and dotted lines, the network address space is partitioned in domains. That is, each domain corresponds to a certain address range of addresses useable in the network. To each domain, as shown in FIG. 2, there is associated a LPA. Of course, more than four domains, generally n domains can be defined, dependent on the size of address space partitions and/or the number of agent entities provisioned to the network NW_1. The significance of the domains/address regions for the present invention will be set out in greater detail in connection with FIGS. 5 and 5A.

Figure 3:
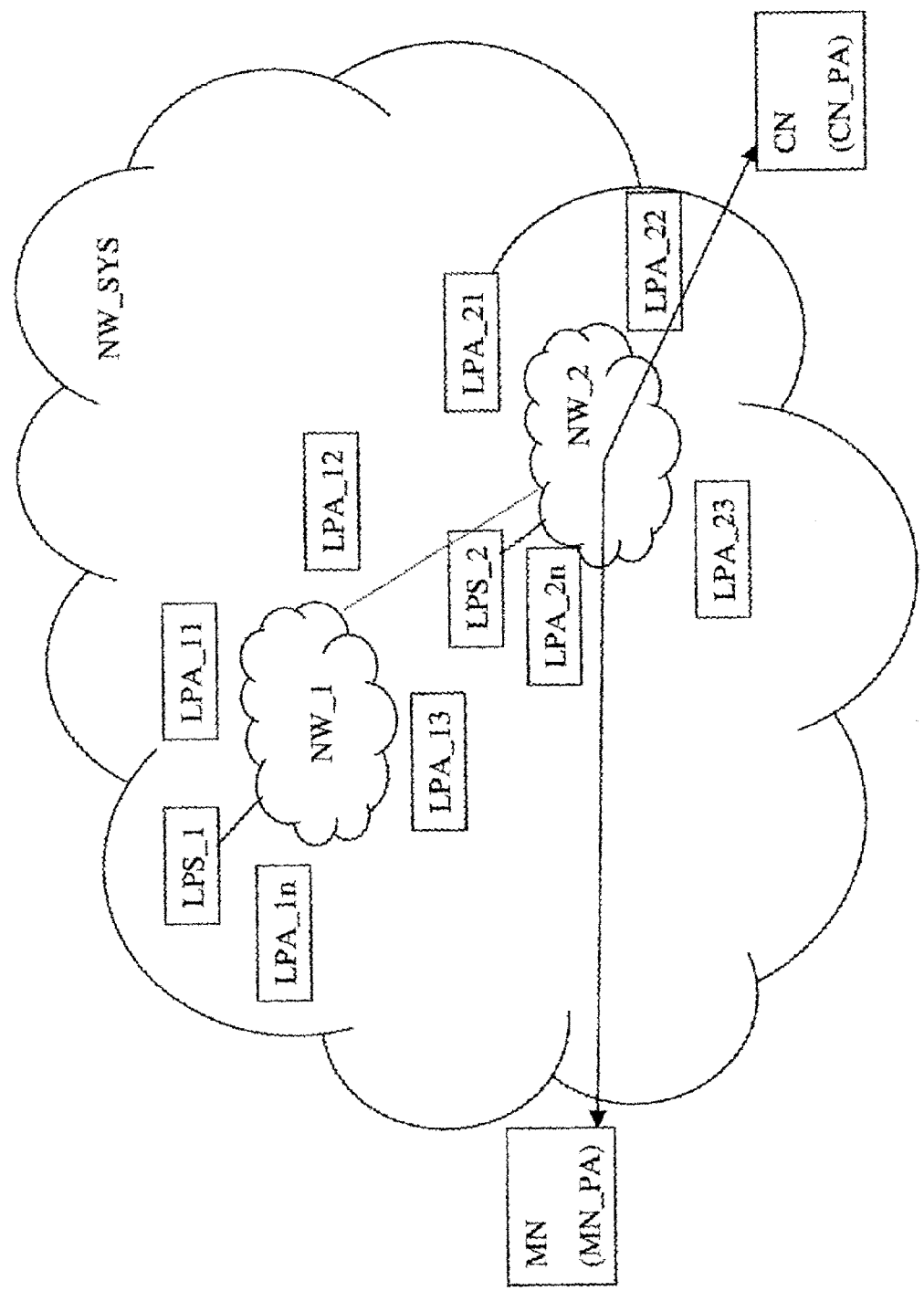
FIG. 3 shows schematically a second example of a communication network system NW_SYS according to the present invention, the system comprising two communication network NW_1, NW_2.

FIG. 3 shows schematically a second example of a communication network system NW_SYS according to the present invention. The system shown in FIG. 3 comprises two communication network NW_1, NW_2, connected to each other as indicated by a dashed line between NW_1 and NW_2. However, the invention is not limited to two networks and the illustration of FIG. 3 has been chosen to keep the illustration complexity low. Also, in order to keep the drawing simple, the domain partitioning shown in FIG. 2 above for one network has been omitted from the representation of FIG. 3. Domains of individual networks, are however, distinguishable from each other by, e.g., a network specific prefix to the addresses. As shown in FIG. 3, the network number, the server entity number and the agent entity number have been "doubled". Associated to the network NW_1 there are a location privacy server entity LPS_1 and location privacy agent entities LPA_11, . . . , LPA1n, whereas associated to the network NW_2 there are a location privacy server entity LPS_2 and location privacy agent entities LPA_21, . . . , LPA_2i. According to FIG. 3, the mobile terminal node MN communicates via NW_2 and selected agent entity LPA_22 with the communication partner node CN, as indicated by the solid line double arrow.

Although FIG. 3 illustrates a scenario in which i=n, i.e. an equal number of agent entities per network is shown, the invention is not limited thereto. Rather, n needs not to equal i and the numbers n, i is determined—individually for each network—upon network configuration and dependent on network size and/or a number of subscribers to the network, and/or the address space available, and/or the like.

Also, although a single server entity LPS_1, LPS_2 is shown per each network, more than one physical location privacy sever entities may be provided. Nevertheless, whether provided as a single entity only or as a distributed entity, the server entity has to be regarded as a single functional server entity per network of the network system.

Note that in case more than one LPS is present within the system, as e.g. shown in FIG. 3, the server entities may communicate with each other in order to obtain a mutual knowledge of the respective contents of their record they maintain. This may be achieved in that a specific server entity inquires other server entities, or in that each server entity broadcasts/distributes its information to other server entities. Note that not the entire record contents needs to be exchanged, but once the entire record is known to the other server entity/entities, it is sufficient to regularly inform other servers about changes occurring in the record(s).

Figure 4:
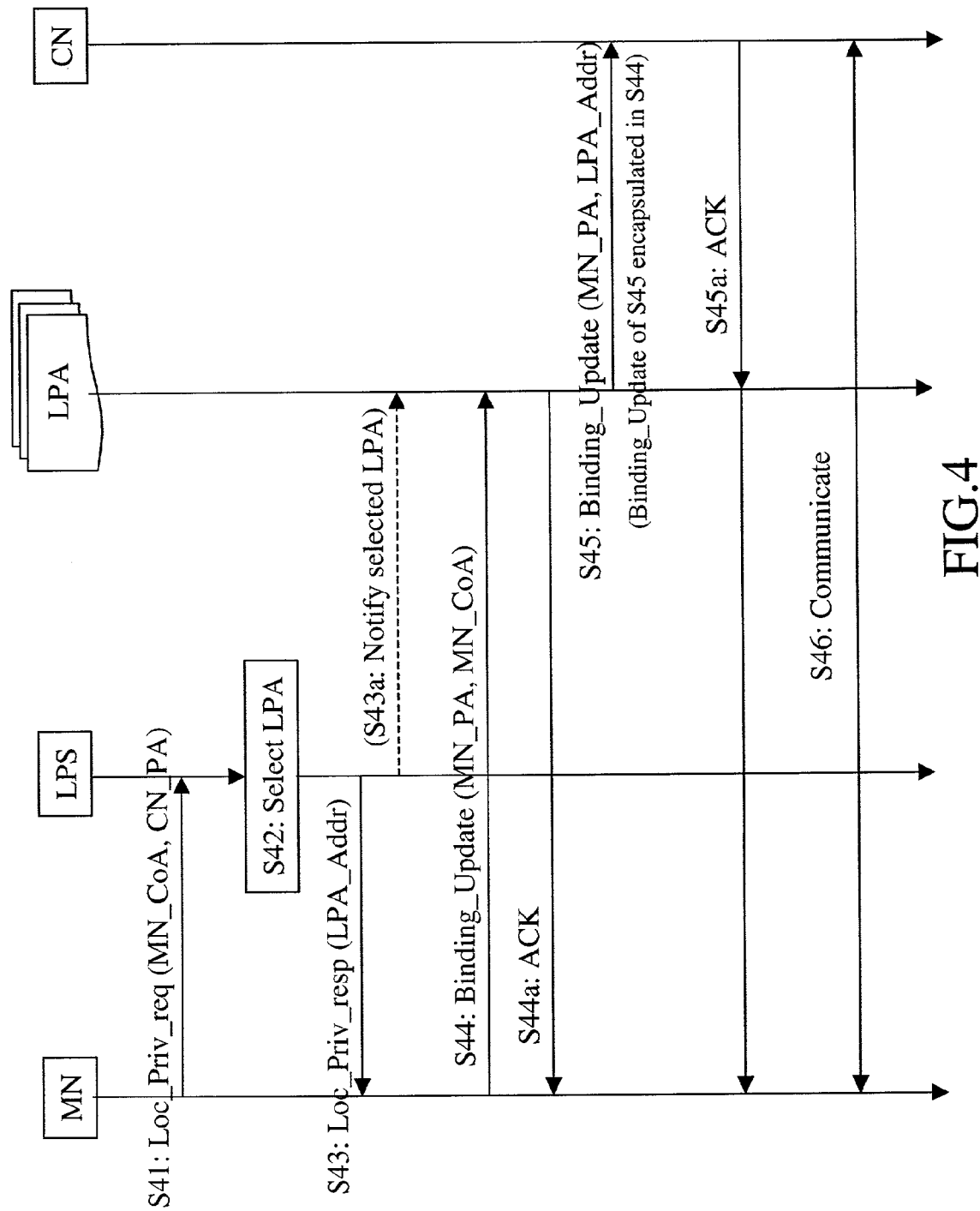
FIG. 4 illustrates a signaling involved between entities of the network system and terminal nodes in connection with the method according to the present invention.

FIG. 4 illustrates a signaling involved between entities of the network system and terminal nodes in connection with the method according to the present invention. Arranged in horizontal direction in the drawing of FIG. 4 are the mobile terminal node MN initiating a communication with location privacy to a communication partner node CN. In establishing location privacy, according to the present invention, there are involved a location privacy server LPS (server entity) and one of a plurality of location privacy agents LPA.

Subsequently, the method according to the present invention will be described with reference to FIG. 4. It is to be noted that in FIG. 4, the messages exchanged between nodes and entities are indicated by horizontal arrows, and the vertical arrangement of the arrows from top to bottom represents the consecutive sequence of messages in time.

The method starts in step S41. In step S41, the mobile terminal node MN issues a location privacy request LOC_Priv_Req to the location privacy server entity LPS. This may be the LPS of the home network of the terminal MN. Alternatively, this may be the LPS of the network currently visited by the terminal MN. The MN can either be pre-configured with the address of the LPS or learn it: the address of the LPS can e.g. be broadcast or the MN can discover it e.g. sending a request to a well-known anycast address). The request issued in step S41 contains the communication partner node's CN address CN as well as the permanent (MN_PA), and temporary (MN_CoA) addresses of the terminal node MN.

Upon receipt of the request at the LPS, the request is evaluated internally by the LPS, which in step S42 selects a proper location privacy agent LPA for communication between the mobile terminal node MN and the communication partner node CN. Basically, the server entity LPS maintains a record of said plurality of agent entities LPA and their respective location within the network system, and the selecting of a specific one of said plurality of agent entities is based on data maintained in said record of said server entity and the MN_CoA contained in the request. According to a refinement of the selection, the selecting comprises the steps of selecting comprises the steps of first retrieving a first network domain represented by a network address range to which address range the temporary address MN_CoA of the requesting terminal node MN belongs, second retrieving a second network domain represented by a network address range to which address range the address CN_A of the communication partner node CN belongs, and determining the agent entity (LPA) to be selected, based on said retrieved information.

Basically, the selection of the LPA is performed based on the MN_CoA and the CN address in that the LPS tries to match the addresses as much as it can, similar to IP routing. Stated in other words, the LPA is selected by means of which, when selected, optimization of the routing between the requesting MN (MN_CoA) and the addressed CN is achieved. Further details of the selection process with reference to an example are described later on in connection with the description of FIGS. 5 and 5A.

Upon selection of the proper agent entity LPA, the server entity LPS, in step S43, returns a location privacy response Loc_Priv_Resp to the requesting terminal node MN. The response indicates the network address LPA_Addr of the selected agent entity LPA to the terminal node MN. Since the location privacy agent entities are fixed agent entities in terms of their position/location within the network, they may be uniquely identified and addressed with a fixed and permanent address.

Optionally, in a step S43a, the server entity LPS may also inform the selected agent entity LPA about its state of being selected for routing subsequent communication messages between the terminal node MN and the communication partner node CN. In this case, the agent entity may already initiate suitable preparatory measures for further communication.

In step S44, the mobile terminal node MN sends a message (e.g. a Binding Update) to the selected Agent entity LPA. This message by said terminal node creates, at said selected agent entity LPA, a mapping between the terminal node's permanent network address (MN_PA) and its temporary network address (MN_CoA). Thus, when forwarding and/or routing messages from the agent entity LPA to the terminal node MN, messages addressed to the mobile terminal node's permanent address MN_PA are routed to its temporary address MN_CoA.

Included and/or encapsulated in that message of S44 (or appended thereto) is a further message (e.g. binding update message) (S45) which is upon "unpacking" at the agent entity LPA, forwarded from the agent entity LPA to the communication partner node CN, step S45. The binding update in step S45 includes the permanent address of the mobile terminal node MN and the selected location privacy agent entity address LPA_Addr. Thus, messages/packets transmitted from the communication partner node CN towards the mobile terminal node MN are routed to the location privacy agent's address, which address to the communication partner node CN appears as the CoA address of the mobile terminal node MN. Stated in other words, the message (e.g. binding update) in step S45 creates, initiated by said terminal node MN at said communication partner node CN, a mapping between the terminal node's permanent network address MN_PA and the selected agent entity's permanent address LPA_Addr. The respective mapping of addresses achieved by the message (e.g. the binding updates) are cached in the agent entity LPA in a memory means and used for routing of messages between the terminal nodes MN, CN.

It is to be noted that the messages (e.g. binding updates), S44, S45, can optionally be authenticated between the appropriate nodes: S44 between MN and the LPA, and S45 between MN and CN. The establishment authentication will roughly be described later on in connection with security considerations. It is nevertheless to be noted that a key for authentication could be statically configured or established using one of the existing authentication mechanisms as already described in various internet drafts. Also, messages S44 and S45 are respectively acknowledged by returning an acknowledgment message ACK in steps S44a and S45a.

Thereafter, upon having created the address mappings as described herein before, in step S46 the terminal nodes MN, CN communicate with each other via the selected LPA. Thus, the node CN sees the LPA network address (e.g. its IP address in case of an IP based communication network) as the temporary address MN_CoA of the mobile node MN.

In communication, when the terminal node MN sends packets to the communication partner node CN, it tunnels the packets first to the selected LPA. This ensures the validity of the source address, and enables ingress filtering. The LPA then decapsulates and forwards the packets to the node CN based on the address indicated in the header of the (unpacked) inner packet.

Note that "tunneling" means that an original packet is encapsulated as an inner packet in an outer packet. The outer header has the LPA address as the destination and the MN_CoA as the source, whereas the inner header has the CN address as the destination and the MN_PA as the source.

Figure 5:
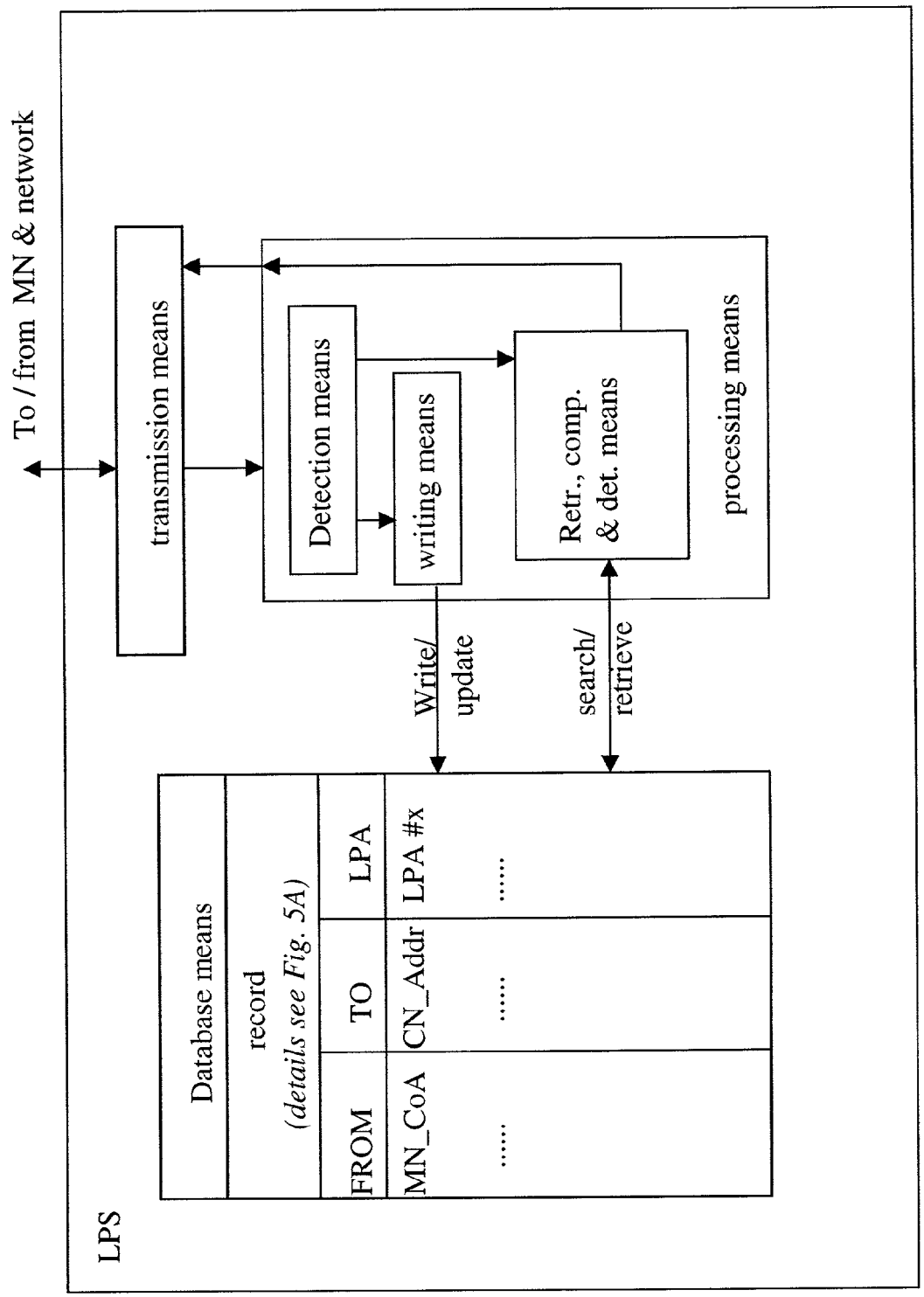
FIG. 5 shows as a simplified block diagram components of a server entity LPS according to the present invention.

When the CN sends a packet to the LPA for the MN, this packet, as specified by e.g. Mobile IPv6, carries a routing header including the MN Home Address or permanent address MN_PA. The destination address is the LPA IP address according to the binding cache it created. And when receiving packets, the LPA looks at the routing header and from the binding, knows the corresponding CoA where it forward the packet: this could be performed by tunneling or Regional Forwarding. Stated in other words, a packet forwarded from the node CN to the selected LPA includes as source address the CN address, as destination the location privacy agent address LPA_Addr, and in the routing header MN_PA, the permanent address of the mobile node MN. The thus constructed packet is processed and/or routed by the LPA further to the MN such that the outgoing packet from the LPA:

either indicates as its source the LPA, and as the destination the temporary address CoA of the terminal node MN, i.e. MN_CoA and contains the inner packet containing the payload Or the LPA just substitute the destination address to the MN_CoA FIG. 5 shows as a simplified block diagram components of a server entity LPS according to the present invention. As shown, the server entity LPS is adapted to communicate with the mobile terminal node MN and/or the network using a transmission means. The transmission means is connected to a processing means. The processing means is connected to a database means.

The processing means in turn comprises a detection means, a writing means and a retrieval/comparing/determination means. The detection means receives incoming messages and/or data via the receiving functionality of the transmission means and detects whether the received data represents a request such as the location privacy request (step S41, FIG. 4) or data concerning said plurality of agent entities LPA and their respective location within the network system, and/or data concerning nodes CN available for communication and their respective address in the communication network system. The detection may be effected on the basis of header information in the respective messages. It is to be noted that the respective location of said agent entities is derivable based on a network domain to which the agent entity is assigned, the domain being represented by a network address range in the network.

If the received data concern the record of the database means, the data are supplied to a writing means, which writes and/or updates the records of the database means. That is, the record is updated with agent entity information and with communication terminal node (address, address range) information.

If the received data concern a location privacy request, they are supplied to the retrieval, comparing and determination means. The MN_CoA address in the request is analyzed to obtain a knowledge in which domain the MN is present. Likewise, based on the address of the communication partner node CN in the request, the position, of the node CN, i.e. the domain in which it is present, is retrieved from the record (if the addressed node is available). Stated in other words, it is checked whether the address CN_PA included in the request (step S41 in FIG. 4) matches one of the domain entries in the record of the database means.

In a follow up step, based on the retrieved domain information for the MN and the CN, the agent entities is selected from the record of the database means. Basically, based on the distance between the position of the node CN and the location of the agent entity LPA, the agent entity which is closest to the communication partner node CN is then selected as the proper location privacy agent, so that routing between the requesting node MN and the called node CN is optimized.

Under the assumption that in FIG. 3 the terminal node MN request communication under location privacy with communication partner node CN, the location privacy agent LPA_22 would be selected as a result of the server check as the closest agent entity. (A server check may comprise checking of the combined database records of servers LPS_1 and LPS_2, as outlined above).

The address of the selected agent entity LPA_22 in the assumed example is then retrieved by the retrieval, comparing and determination means and output therefrom to the transmission means.

The transmission means then provides the location privacy response to the mobile terminal MN (step S43 in FIG. 4) and/or the optional notification of the selected agent entity LPA_22 (step S43a in FIG. 4).

FIG. 5A shows in more detail an example of the database record of the LPS. As already outlined in FIG. 5 itself, the record contains three columns. Based of the information contained therein, a selection of the proper LPA is enabled in a manner that it is retrieved FROM where which MN requests location privacy TO which communication partner node CN. This is mainly based on the addresses of the nodes involved, as explained with reference to FIG. 5A. The MN_CoA is analyzed and the position of the MN is retrieved based on the address on a domain level (address range). Likewise, the position of the called node CN is retrieved based on ist address on a domain level. Based on the retrieved domain levels, the record then includes an entry of the proper LPA to be selected. Thus, based on the MN_CoA and the CN address, the closest LPA to the CN can be selected, but also the one which optimizes the routing between the MN_CoA and the CN address.

In FIG. 5A, for example, the MN_CoA being found to be in domain #1, while the CN address being found to be in domain #3, then LPA#3 is selected. On the other hand, the MN_CoA being found to be in domain #2, while the CN address being found to be in domain #3, then LPA#1 is selected.

Thus, the LPA is selected based on the MN_CoA address and the CN address in order to optimize routing. (Note that the example in FIG. 5A does not necessarily coincide with the illustration in e.g. FIGS. 2 and 3 but is independent from these figures.)

Figure 6:
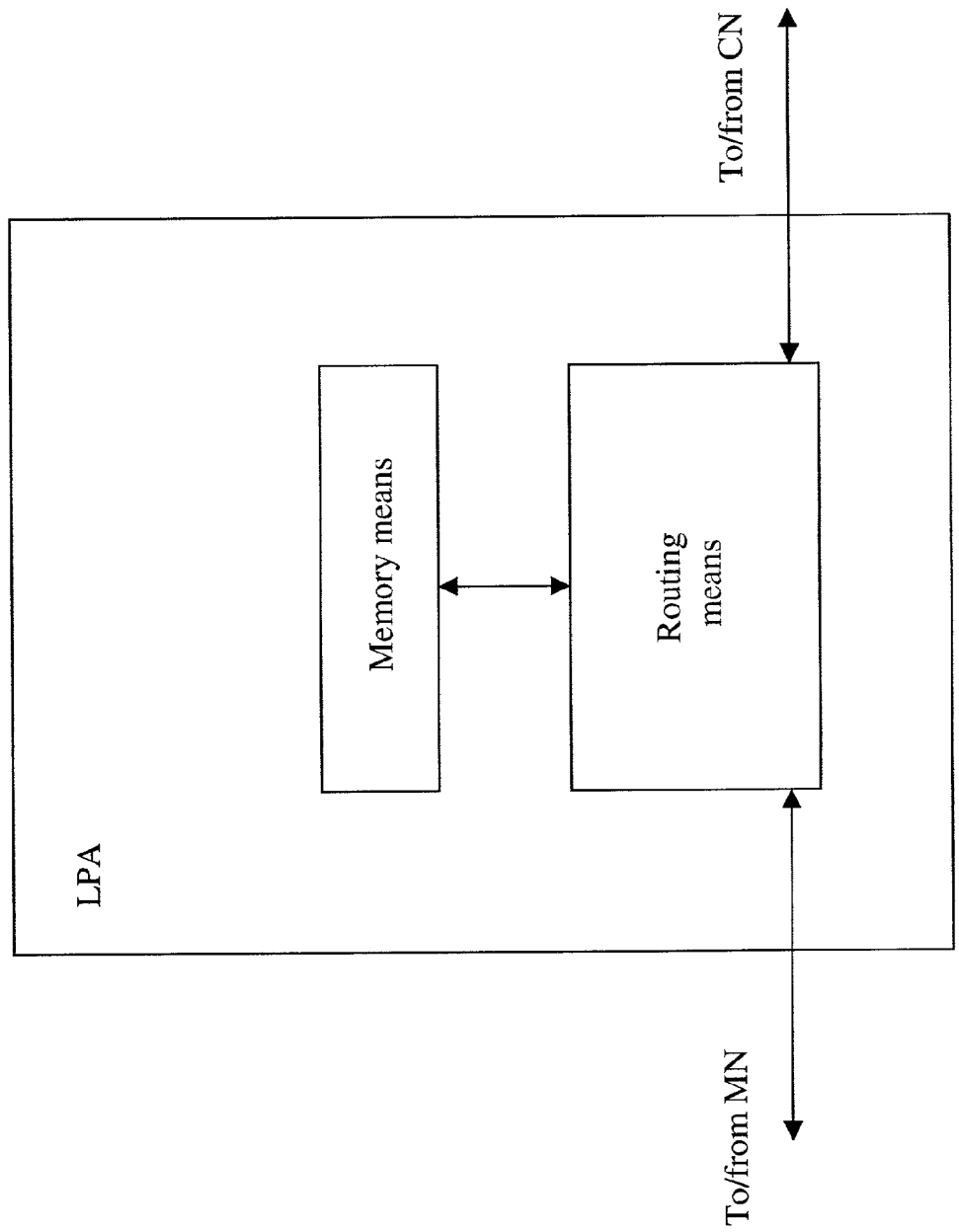
FIG. 6 shows as a simplified block diagram components of an agent entity LPA according to the present invention.

FIG. 6 shows as a simplified block diagram components of an agent entity LPA according to the present invention. As mentioned before, the location privacy agent basically serves as a router between the mobile terminal node MN and the communication partner CN and vice versa. To this end, as shown in FIG. 6, a location privacy agent comprises a routing means connected to a memory means. The memory means contains the address mappings as previously described in connection with the created binding. That is, a decapsulation functionality for MN->CN forwarding direction and an address mapping for CN->MN forwarding direction, so that a repeated description thereof is considered to be superfluous.

Furthermore, it is to be understood that each location privacy requesting terminal node such as MN for use with a communication network system according to the above description is adapted to perform the method described herein before.

Packet Formats

The solution according to the present invention requires two new messages (Location Privacy Request, Location Privacy Response) exchanged between the MN and the Location Privacy Server to get a Location Privacy agent. These messages could e.g. be two new UDP messages as detailed in FIGS. 7 (7A, 7B, 7C) and FIG. 8 (8A, 8B)

Figure 7B:
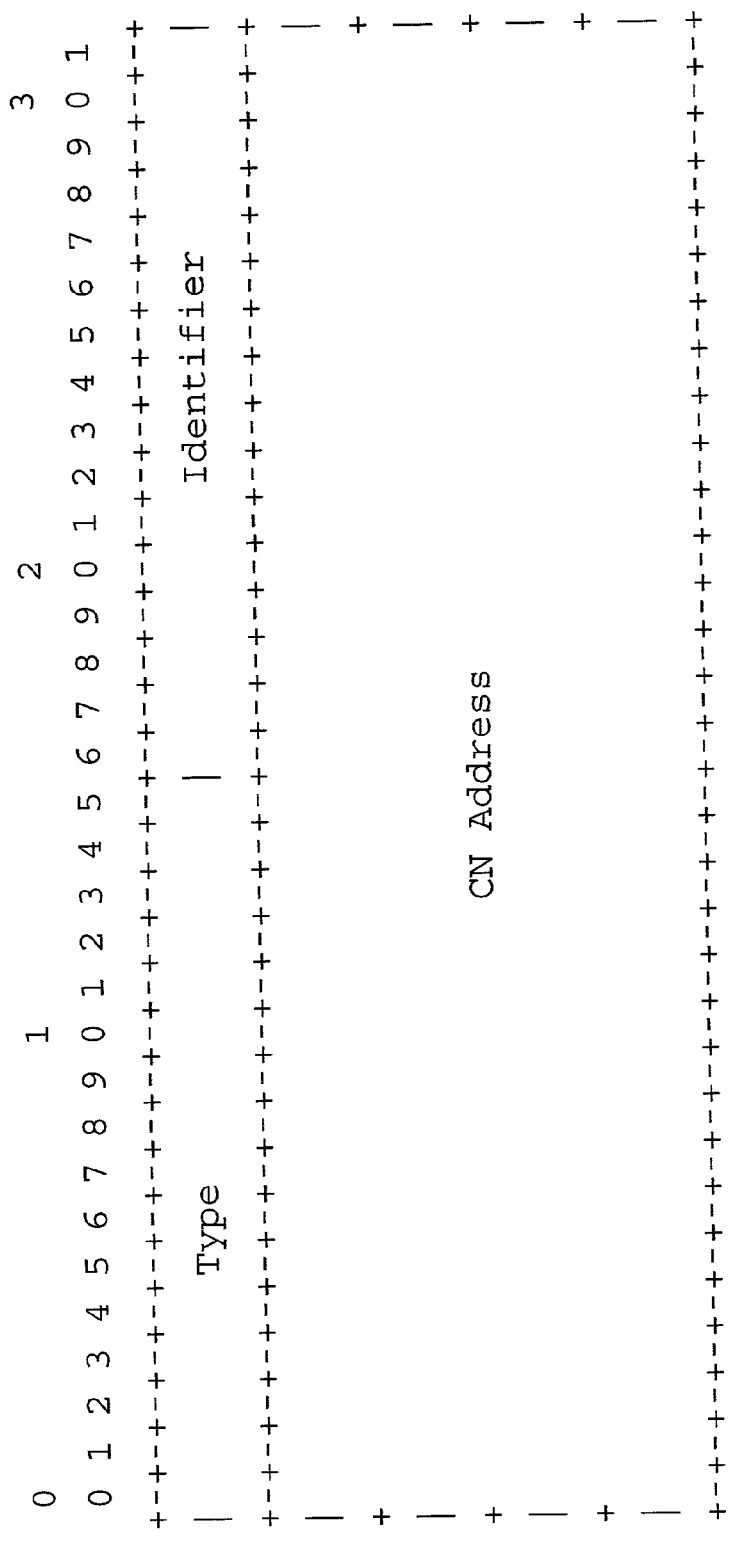

Location Privacy Request Message [FIGS. 7 (7A, 7B, 7C)]

The Location Privacy Request message is used by a mobile node to get a Location Privacy agent. The mobile node sends a Location Privacy Request message to either a pre-defined well-known anycast address if the mobile node does not know the address of any LPS, or to the unicast address of a LPS if the mobile node is pre-configured with one of them. This message should carry the home address of the mobile node as well as its care of address and address of correspondent node. The LPS then responds to the mobile node with a Location Privacy Response message giving the address of the assigned LPA.

Location Privacy Response Message [FIG. 8 (8A, 8B)]

The Location Privacy Response message is sent in response to a Location Privacy Request message. The LPS informs the mobile node of the assigned LPA.

Protocol Details

Routing of Packets from the Mobile Node to the Correspondent Node

The MN should not send packets to the CN with the CoA as the source IP address; otherwise the CN will be able to retrieve information about the MN's location from the source address of these received packets.

The outgoing packets coming from the MN although must have their source address as the CoA to bypass ingress filtering.

As described earlier above, the MN should therefore first send ist packets to the LPA. Two options are possible:

1) First the packets originated from the MN could be sent with a source IP address set to the MN's LPA address and a destination IP address to the CN address; these packets would first be tunneled to the LPA with a outer header therefore set with a source IP address, equals to the MN's CoA and the destination IP address pointing to the LPA address. The LPA would then decapsulate the packets and route them to the CN, which will not be aware of the MN's CoA but believe packets are coming from the LPA address. This first option only relies on IP routing capabilities, and only requires the LPA to be capable of encapsulating/decapsulating IP packets. But as a drawback, the packets coming from the MN have two headers. Over some access links where the resources are limited and expensive, this may not be desirable.

2) The second option solves this problem with the cost of more processing at the LPA: The MN sends the packets with a source IP address set to the MN's CoA
the destination IP address set to the LPA address
a routing header destination option with the CN's address
a Home address destination option Upon receiving this packet, the LPA verifies that it has a binding cache for this MN with the corresponding home address and CoA, and if successful:

substitutes the destination IP address to the CN's address which was carried in the Routing Header removes the Routing header destination option for the CN not be able to learn the MN's CoA substitutes the source IP address to the LPA address Delivery of Packets from the CN to the MN Packets Sent from the Correspondent Node to the Mobile Node Will Be Sent to the LPA with a Routing Header Carrying the Home Address of the Mobile Node.

Thanks to this MN's home address, the LPA can retrieve the MN's CoA and forward it to the MN. The LPA can:

either, simply tunnel the packets to the MN's CoA (but this has the drawback of an additional IP header which may not be desirable over some access links where the bandwidth is limited)

or substitute the destination IP address field which was set to the LPA address, to the MN's CoA.

Security Considerations

Security of the Location Privacy Request/Response Messages

The Location Privacy Request and Location Privacy Response messages should at least be authenticated, and eventually be encrypted. Since these messages are defined as new UDP messages, AH and ESP can be used without any modification to these protocols: the CN and LPA addresses can in addition be encrypted. The mobile node and the LPS can either have a pre-established security association or can dynamically set it up using protocols such as IKE or any appropriate one.

Security of the Binding Update Messages

As required by Mobile IP, the binding update messages sent from the mobile node to the LPA and to the CN must be authenticated with the appropriate security association. If strong authentication is desired between the MN and the LPA, the LPS when assigning the LPA can actually also act as a Key Distribution Center and send some keying material to the MN in the Location Privacy Response, and the corresponding session key to the LPA.

The MN and the LPA may as well have a pre-established security association.

As for the authentication of the binding update between the MN and the CN, this one is not affected: the MN should use the security association it has established with the CN according to the policies and the capabilities.

End to End Protection

It has to be noted that if the MN and the CN use either ESP or AH to protect their data, this Location privacy mechanism does not break this end-to-end security.

Computation of the Authentication Data

Independent of the mechanism used for routing the packets exchanged between the mobile node and the correspondent node (see above: tunneling vs. processing at the LPA), the mobile node should:

for outgoing packets, compute the authentication data based on the packet as received by the correspondent node for incoming packets, verify the authentication data based on the packet as sent by the correspondent node.

Thus, in summary, in communication between e.g. an IPv6 terminal MN and destination node CN, when using routing optimization, the location of the MN can be determined by its (temporary) IPv6 address (care-of-address). One prior solution to avoid this is to forward any traffic through a Home Agent, that will hide the IPv6 address of MN form the CN. Both packets from the MN to the CN, and packets from the CN to the MN needs to pass by the Home Agent to provide location privacy: Packets from the MN needs to go via the Home agent not to reveal the MN_CoA to the CN, and to bypass ingress filtering; whereas packets from the CN needs to go through the home Agent in order to be able to be delivered to the MN. These routing mechanisms, also called triangular routing and reverse-tunneling, may imply long communication distances.

The present invention as described above presents a method to avoid these long legs while providing location privacy. The MN sends a location privacy request message to a specific Location Privacy Server. LPS assigns a specific Location Privacy Agent, that will be used instead of HA in hiding the UEIPv6 address. The geographical location of the LPA will be determined as close to CN as possible, and as close as possible to the MN-CN path, to avoid long communication distances in path CN=>LPA=>MN.

Accordingly, as has been described herein above, the present invention concerns a method for providing location privacy for a terminal node MN in communication with a communication partner node CN in a communication network system comprising at least a first communication network HN, VN, wherein a respective node MN communicating via said communication network system is identified by its permanent network address MN_PA and addressable by a temporary network address MN_CoA, at least one server entity LPS, a plurality of agent entities LPA1, . . . , LPAn, wherein each of said at least one server entities LPS maintains a record of said plurality of agent entities LPA1, . . . , LPAn and their respective location within the network system, said method comprising the steps of: requesting S41, by said terminal node MN, said at least one server entity LPS for location privacy, selecting (S42), at said at least one server entity LPS, a specific one of said plurality of agent entities LPA1, . . . , LPAn, based on data maintained in said record of said server entity and said temporary network address of said requesting terminal node, and communicating S46 messages between said terminal node MN and said communication partner node CN via said selected one LPA of said agent entities. The present invention also, concerns corresponding network systems, server entities, agent entities and terminal nodes.

Although the present invention has been described herein above with reference to its preferred embodiments, it should be understood that numerous modifications may be made thereto without departing from the spirit and scope of the invention. It is intended that all such modifications fall within the scope of the appended claims.

In particular, options outlined for various individual aspects of the invention may be combined with each other unless it is expressly mentioned that such a combination is not feasible.

What is claimed is:

1. A method, comprising:

providing location privacy for a terminal node in communication with a communication partner node in a communication network system comprising at least a first communication network, at least one server entity, and a plurality of agent entities;

identifying a respective node communicating via said communication network system by its permanent network address and addressing the respective node by a temporary network address;

maintaining by each of said at least one server entities a record of said plurality of agent entities and their respective location within the network system;

requesting, by said terminal node, said at least one server entity for location privacy;

selecting, at said at least one server entity, a specific one of said plurality of agent entities, based on data maintained in said record of said server entity and said temporary network address of said requesting terminal node; and communicating messages between said terminal node and said communication partner node via said selected one of said agent entities.

2. The method according to claim 1, further comprising:

configuring said request to include the network address of said communication partner node with which a communication is desired to be performed, the permanent network address of said requesting terminal node, and said temporary network address of said requesting terminal node by which it is addressable within said communication network system.

3. The method according to claim 1, further comprising:
deriving said respective location of said agent entities based on a network domain to which the agent entity is assigned; and
representing the domain by a network address range in the network.

4. The method according to claim 3, further comprising:
basing said selecting on said known network address of said communication partner node with which a communication is desired to be performed, which is included in said request.

5. The method according to claim 4, wherein said selecting comprises:
first retrieving a first network domain represented by a network address range to which address range the temporary address of the requesting terminal node belongs;
second retrieving a second network domain represented by a network address range to which address range the address of the communication partner node belongs; and
determining the agent entity to be selected, based on said retrieved information.

6. The method according to claim 1, further comprising:
informing said requesting terminal node about the selected agent entity before communicating messages.

7. The method according to claim 1, further comprising:
creating, by said terminal node at said selected agent entity, a mapping between the terminal node's permanent network address and its temporary network address; and
creating, by said terminal node at said communication partner node, a mapping between the terminal node's permanent network address and the selected agent entity's address.

8. A communication network system, comprising:
at least a first communication network, wherein a respective node communicating via said communication network system is identified by its permanent network address and addressable by a temporary network address;
at least one server entity;
a plurality of agent entities; wherein each of said at least one server entity maintains a record of said plurality of agent entities and their location within the network system;
a database configured to maintain a record of said plurality of agent entities and their respective location within said communication network system; and
a processor configured to select a specific one of said plurality of agent entities, based on data maintained in said record and a temporary network address of a requesting terminal node.

9. The communication network system according to claim 8, wherein:
said respective location of said agent entities is derivable based on a network domain to which the agent entity is assigned, the domain being represented by a network address range in the network.

10. The communication network system according to claim 8, wherein:
to each of said communication networks there is associated one of said server entities.

11. The communication network system according to claim 8, wherein:
to each of said communication networks there is associated a plurality of said agent entities.

12. The communication network system according to claim 8, wherein:
said respective location of said agent entities is derivable based on a network domain to which the agent entity is assigned, the domain being represented by a network address range in the network.

13. The communication network system according to claim 12, wherein said processor comprises:
a selector configured to comprise a first retrieving unit configured to retrieve a first network domain represented by a network address range to which address range the temporary address of the requesting terminal node belongs;
a second retrieving unit configured to retrieve a second network domain represented by a network address range to which address range the address of the communication partner node belongs; and
a determination unit configured to determine the agent entity to be selected, based on said retrieved information.

14. The communication network system according to claim 8, wherein:
said record is configured by a network operator dependent on a topology of a communication network forming a communication network system.

15. The communication network system according to claim 14, wherein:
said record is configured by a network operator dependent on a topology of a communication network forming a communication network system, and said server entity is configured to extend said record by adding record information from other server entities within said communication network system.

16. The communication network system according to claim 8, wherein:
said record is configured by a network operator dependent on a topology of a communication network forming a communication network system, and said server entity is configured to extend said record by adding record information from other server entities within said communication network system.

17. The communication network system according to claim 8, further comprising:
a transmitter configured to receive and send information used for forming and maintaining said record, receive requests from terminal nodes, and configured to send processing results to a requesting terminal.

18. The communication network system according to claim 17, wherein:
said transmission unit is configured to send processing results to a selected agent entity.

19. The communication network system according to claim 8, wherein each of said plurality of agent entities comprises
a memory unit configured to cache a mapping of a permanent address identifying a terminal node to a temporary address of said terminal node indicative of a location of said terminal node, and
a routing unit configured to forward data packets received from said terminal node to an addressed communication partner node and to forward data packets received from said communication partner to said terminal node, wherein said forwarding is based on the cached mapping information in said memory unit.

20. A communication network system, comprising:

at least a first communication network wherein a respective terminal node communicating via said communication network system is identified by its permanent network address and addressable by a temporary network address;

at least one server entity;

a plurality of agent entities; and wherein each of said at least one server entity maintains a record of said plurality of agent entities and their location within the network system, wherein said terminal node is configured to provide location privacy for a terminal node in communication with a communication partner node in said communication network system comprising at least a first communication network, identifying a respective node communicating via said communication network system by its permanent network address and address the respective node by a temporary network address, maintain by each of said at least one server entity a record of said plurality of agent entities and their respective location within the network system, request, by said terminal node, said at least one server entity for location privacy, select, at said at least one server entity, a specific one of said plurality of agent entities, based on data maintained in said record of said server entity and said temporary network address of said requesting terminal node, and communicate messages between said terminal node and said communication partner node via said selected one of said agent entities.

21. A communication network system, comprising:

at least a first communication network, wherein a respective terminal node communicating via said communication network system is identified by its permanent network address and addressable by a temporary network address;

at least one server entity; and a plurality of agent entities; wherein each of said at least one server entity maintains a record of said plurality of agent entities and their location within the network system, wherein said terminal node is configured to first retrieve a first network domain represented by a network address range to which address range the temporary address of the terminal node belongs, second retrieve a second network domain represented by a network address range to which address range the address of a communication partner node belongs, and determine an agent entity to be selected, based on said retrieved information.

22. A communication network system, comprising:

at least a first communication network, wherein a respective terminal node communicating via said communication network system is identified by its permanent network address and addressable by a temporary network address;

at least one server entity; and a plurality of agent entities; wherein each of said at least one server entity maintains a record of said plurality of agent entities and their location within the network system, wherein said terminal node is configured to create, by said terminal node at a selected agent entity, a mapping between the terminal node's permanent network address and its temporary network address, and create, by said terminal node at a communication partner node, a mapping between the terminal node's permanent network address and a selected agent entity's address.

23. A communication network system, comprising:

at least a first communication network, wherein a respective node communicating via said communication network system is identified by its permanent network address and addressable by a temporary network address;

at least one server entity;

a plurality of agent entities, wherein each of said at least one server entity maintains a record of said plurality of agent entities and their location within the network system;

database means for maintaining a record of said plurality of agent entities and their respective location within said communication network system; and processing means for selecting a specific one of said plurality of agents entities, based on data maintained in said record and a temporary network address of a requesting terminal node.

* * * * *